(12) United States Patent
Nitert et al.

(10) Patent No.: US 8,648,273 B2
(45) Date of Patent: Feb. 11, 2014

(54) SWITCHING INSTALLATION WITH ARC PROTECTION AND ARC PROTECTION METHOD

(75) Inventors: Gerhardus Leonardus Nitert, Enter (NL); Arend Jan Willem Lammers, Hengelo (NL)

(73) Assignee: Eaton Industries (Netherlands) B.V., Hengelo (NL)

( * ) Notice: Subject to any disclaimer, the term of this patent is extended or adjusted under 35 U.S.C. 154(b) by 312 days.

(21) Appl. No.: 13/120,498

(22) PCT Filed: Sep. 25, 2009

(86) PCT No.: PCT/EP2009/062451
§ 371 (c)(1),
(2), (4) Date: Mar. 23, 2011

(87) PCT Pub. No.: WO2010/034814
PCT Pub. Date: Apr. 1, 2010

(65) Prior Publication Data
US 2011/0174780 A1 Jul. 21, 2011

(30) Foreign Application Priority Data
Sep. 26, 2008 (EP) .................................... 08165193

(51) Int. Cl.
*H02B 13/055* (2006.01)
*H01H 33/53* (2006.01)
(52) U.S. Cl.
USPC .............................. 218/68; 218/120; 218/139

(58) Field of Classification Search
USPC ........ 218/1–7, 14, 153, 154, 43–85; 200/400, 200/401
See application file for complete search history.

(56) References Cited

U.S. PATENT DOCUMENTS

| 4,286,301 A | 8/1981 | Pham Van |
| 5,591,948 A * | 1/1997 | Bolongeat-Mobleu et al. ................................ 218/68 |
| 7,935,907 B2 * | 5/2011 | Espeseth et al. ................ 218/89 |
| 2009/0008229 A1 | 1/2009 | Granhaug et al. |

FOREIGN PATENT DOCUMENTS

| DE | 3131417 A1 | 2/1983 |
| DE | 10 2006 033 766 A1 | 7/2007 |
| EP | 1 463 172 A1 | 9/2004 |

* cited by examiner

*Primary Examiner* — Amy Cohen Johnson
*Assistant Examiner* — Marina Fishman
(74) *Attorney, Agent, or Firm* — Eckert Seamans Cherin & Mellott, LLC; Kirk D. Houser

(57) ABSTRACT

A switching installation including a gas-filled enclosure, an input conductor, an actuator and a short-circuit device. The actuator is arranged to actuate the short-circuit device upon the occurrence of a first arc in the enclosure. The short-circuit device creates, upon being actuated, a short-circuit through the solid insulation between the input conductor and the enclosure or a separate ground point. The actuator can be arranged to react on an increase in pressure in the enclosure upon the occurrence of the first arc. The gas can be air or SF6. The short-circuit device can create, upon being actuated, the short-circuit through a section of a solid cable insulation isolating the input conductor from the enclosure.

13 Claims, 12 Drawing Sheets

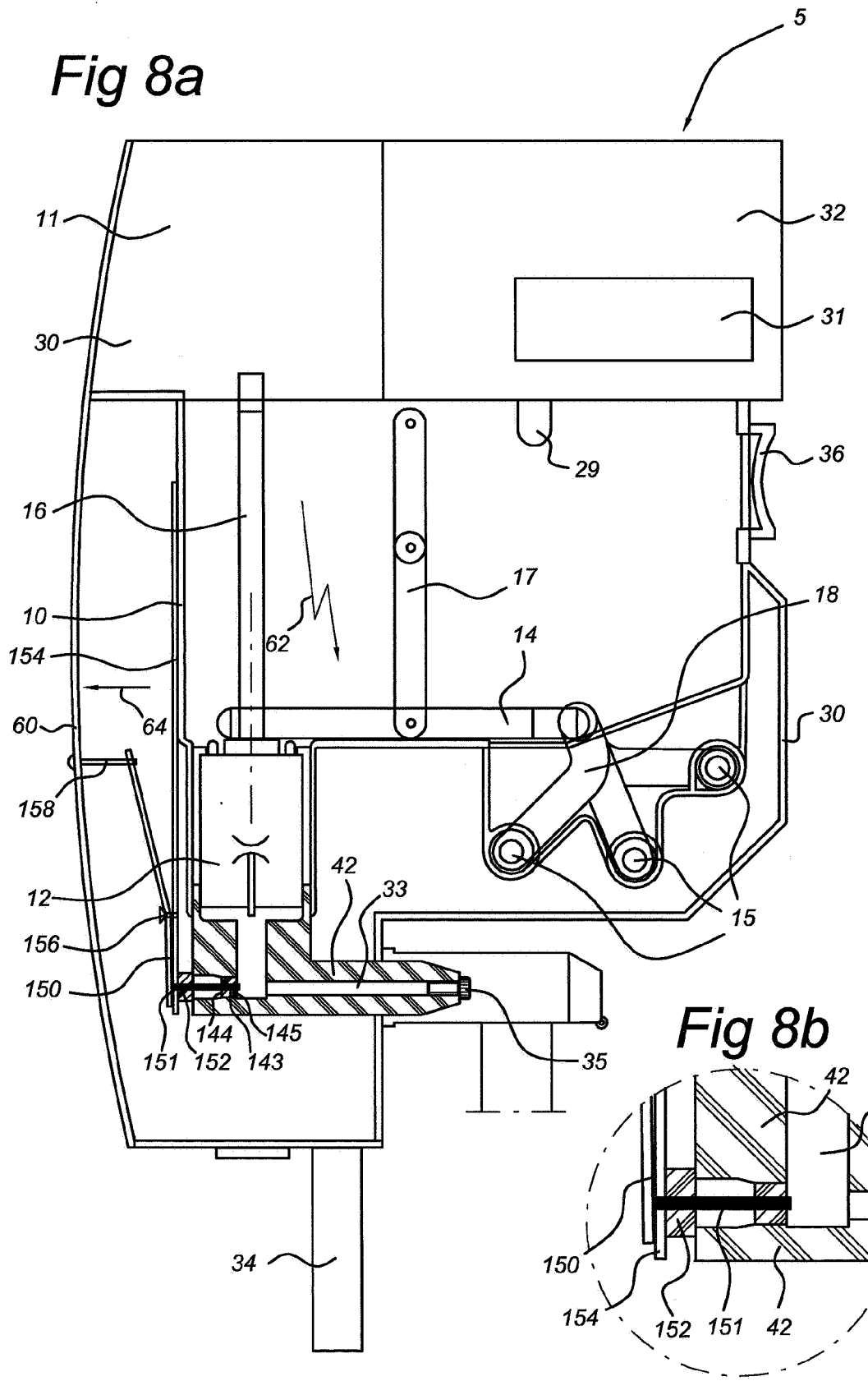

SWITCHING INSTALLATION WITH ARC PROTECTION AND ARC PROTECTION METHOD

TECHNICAL FIELD

The present invention relates to a switching installation comprising a gas-filled enclosure. The invention also relates to method for use with such switching installation.

BACKGROUND

Medium and high voltage switching installations, for voltages of over 1000 V, are widely used with $SF_6$ insulation due to its good insulation properties, allowing to obtain compact installations. There is however a strong wish to move away from $SF_6$ as insulation medium, on account of the negative consequences of $SF_6$ for the environment—notably of its decomposition products HF, $SOF_2$ and $SO_2$—. Therefore, air is used more and more as an insulation medium. As a consequence of the factor 2 to 4 less well insulation quality of air, the size of the installation needs to be increased to prevent electrical sparkover or arcing between the various voltage-carrying parts. This in turn leads to an increase in the amount of energy released upon occasional arcing, as the amount of energy is proportional to the size of the arc, which is proportional to the distance between the conductive parts.

Without further measures, the energetic arcing will continue until the voltage is taken of the voltage-carrying parts, which is generally done by switching the installation off of the grid with an external switch further up in the grid in a power supply line feeding the switching installation. Such external switching is generally done after about one second after the misbehaviour of the switching installation has been detected by an external monitoring system in the grid. One second of energetic arcing may however result in a significant danger and damage. The switching installation thus has to be equipped with a measure to take away the energetic arc that is sufficiently fast to reduce the effects to acceptable levels.

A switching installation with an air-filled enclosure with arc protection is described in EP 1 463 172 A1, in which the input conductor is automatically grounded upon the occurrence of an energetic arc in the enclosure, in order to stop the arcing. It relies on a pressure increase in the enclosure upon the occurrence of an energetic arc and the resulting heating of the air. The enclosure comprises a venting panel, which opens upon an increase of the pressure in the enclosure and, via a flexible cable, acts on an earthing switch. The earthing switch short-circuits the conductor to ground, such that the arcing stops.

The known switching installation has the drawback that, although the arcing is stopped, hot gasses are released through the venting panel and may thus comprise a safety risk for operating personnel in the vicinity of the switching installation. It is further believed that the mechanism used in EP 1 463 172 A1 for grounding the input conductor is not always sufficiently reliable.

Another example of a switching installation in which pressure generated by an internal arc is used for actuating a grounding switch is shown in EP 0 235 755 A1. Also in this installation, actuation of the grounding switch causes the internal arc to dissappear. It is further believed that the robustness, and hence the safety, of the mechanism used in EP 0 235 755 A1 for actuating the grounding switch is not optimal.

A robust arc protection mechanism is also beneficial for systems using $SF_6$ insulation. Although an arc in such a system is shorter, hence less energetic, arcing may still cause damage to the switching installation, which may cause a unwanted release of hot gasses, such as the $SF_6$-decomposition products, and more important a safety risk for operating personnel. Moreover, as $SF_6$ is a greenhouse gas, release of $SF_6$ is unwanted for environmental reasons.

SUMMARY

Therefore, the present invention aims to provide a switching installation comprising a gas-filled enclosure with an improved level of safety against the effects of the occurrence of arcing, with a large degree of robustness.

For this purpose, the switching installation comprising a gas-filled enclosure comprises:
   an input conductor arranged to carry an input voltage,
   a solid insulation arranged between the input conductor and the enclosure to insulate them from each other;
   a ground point;
   an actuator; and
   a short-circuit device,
wherein:
   the short-circuit device is changeable from a first condition in which the solid insulation is insulating the input conductor from the enclosure to a second condition in which the short-circuit device forms a connection between the input conductor and the ground point through the solid insulation, and
   the actuator is arranged to actuate the short-circuit device from the first condition to the second condition upon the occurrence of a first arc in the enclosure.

As soon as the connection is created forming a short-circuit between the input conductor and the ground point through the solid insulation, the first arc will extinguish. The risk that the installation will be damaged is thus reduced. Moreover, if the enclosure would anyhow break, the release of hot gasses and possibly even fire will be less energetic and its effects less severe. As a result, the associated risk for the installation and the people in its vicinity, e.g. the operators, is reduced.

Also the short-circuit will be at a well-defined position, i.e., with the short-circuit device. This can be beneficially exploited when designing the enclosure, as there is less need to design the complete enclosure to be able to withstand an energetic arc at any position for a significant time. Moreover, the operation mechanism has been found to be very reliable as the short-circuit is created through the solid insulation.

The gas e.g. comprises substantially air or $SF_6$.

In an embodiment, the connection in the second condition is established between the input conductor and the ground point via the enclosure.

The ground point may be part of the enclosure.

In an embodiment, the connection in the second condition is established between the input conductor and the ground point being separate from and located inside the enclosure.

Such ground point may be referred to as a separate ground point. Using such separate ground point may be advantageous when designing the switching installation, as it may provide more design freedom compared to the situation where the ground point is part of the enclosure.

In a further embodiment, the actuator is arranged to react on an increase in pressure in the enclosure upon the occurrence of the first arc.

The occurrence of an energetic arc will lead to an increase of the pressure in the enclosure, as the gas expands upon being heated. This pressure will be referred to as the arc pressure.

In one embodiment, the actuator comprises a mechanical link with the enclosure and the actuator is arranged to transfer an expansion of a part of the enclosure to the short-circuit device using the mechanical link.

Upon the occurrence of an energetic arc, the arc pressure generates an expansion of the enclosure, or a section thereof. This expansion can be directly transferred by a mechanical link connected to the expanding section. The mechanical link will thus move with the expansion of the enclosure, and actuate the short-circuit device.

The short-circuit device may be mechanically connected to the actuator. The short-circuit device may alternatively be positioned at a small distance from the actuator, such that the actuator can freely move over a small distance before actuating the short-circuit device.

In an alternative embodiment, the actuator comprises a pressure box with a flexible input surface and a flexible output surface connected to the short-circuit device, the pressure box being arranged for reacting on the increase in pressure in the enclosure with an inward movement of the flexible input surface and generating an outward movement of the flexible output surface.

The arc pressure will act upon the pressure box, and will thus be transferred by the pressure box to a movement driving the short-circuit device.

In another alternative embodiment, the actuator comprises an arc detector sensing the occurrence of an arc.

The arc detector may detect a level of light originating from the first arc or a level of ionization originating from the first arc. Also, the arc detector may actively sense the pressure increase using a pressure sensor. Once the arc detector senses the occurrence of an arc, the actuator will be operated to drive the short-circuit device.

In embodiments, the actuator and the short-circuit device are situated inside the enclosure.

This has the advantage that no additional space is required around the enclosure, so as not to increase the space required to fit the enclosure. Moreover, this allows an unobstructed operation of the actuator and the short-circuit device, as no parts or devices outside the enclosure can obstruct the movements within of the actuator and the short-circuit device.

In a further embodiment, the solid isolation comprises a solid cable isolation for isolating the input conductor and the short-circuit device is arranged to create, upon being actuated, the short-circuit through a section of the solid cable insulation.

The short-circuit is thus created in an environment comprising solid insulating material in stead of an environment comprising a gas. The short-circuit is thus well-controlled and located at a relatively safe location.

In a further embodiment, the solid cable isolation is provided with a hole, and the short-circuit device is at least partially situated in the hole.

In an embodiment, the short-circuit device comprises a driving peg and an insulating plug with a first surface and a second surface, the insulating plug being inserted in the hole of the solid cable isolation.

The driving peg may be arranged to, when actuated by the actuator, perforate the insulating plug from the first surface to the second surface and come into contact with the input conductor.

Thus, after perforating the insulating plug, the driving peg comes in substantially direct contact with the input conductor, thus short-circuiting the cable connector to ground. The driving peg is designed so as to withstand the short circuit current and the associated heat generated in the driving peg when carrying the short circuit current. Thus, a non-interrupted, metallic grounding path is created in a robust manner.

The insulating plug may be a substantially solid plug made from an insulating material.

The insulating plug may comprise a rubber material.

The rubber allows easy penetration by the driving peg. Moreover, the rubber provides a good dielectric isolation between the voltage carrying input conductor at one side of the insulating plug and the grounded parts at the other side of the insulating plug.

In an embodiment, the short-circuit device comprises a vacuum chamber, the vacuum chamber being inserted in the hole and arranged for:
  insulating the input conductor from the enclosure with a vacuum in the vacuum chamber in a first state associated with the first condition, and
  short-circuiting the input conductor to the enclosure in a second state associated with the second condition.

The vacuum chamber thus forms an insulating plug with a very good insulation in the first state. By braking this insulation, the input conductor is short-circuited.

In a further embodiment, the short-circuit device further comprises a driving peg being arranged to change the vacuum chamber from the first state to the second state when actuated by the actuator.

The driving peg may be in contact with the enclosure, e.g., via a conductive mechanical connection to the enclosure. The driving peg may be conductive. The driving peg may be grounded, directly, via the enclosure or indirectly.

The vacuum chamber may be positioned in a hole in a solid insulation around the cable connector. The solid insulation and the vacuum chamber assure that the part of the switching installation where all high voltage parts are positioned at close distance to the enclosure and other parts is well insulated from the enclosure and other parts during normal operation. The insulation is broken once the short-circuit device is actuated by the actuator upon an expansion of the expanding section of the enclosure when a high-energetic arc occurs.

In further embodiments, the vacuum chamber may function similarly as the insulating plug described above, providing good insulation when in tact and creating the short-circuit when perforated by the driving peg.

Hereto, the vacuum chamber may comprise an end cap arranged to:
  maintain a vacuum in the vacuum chamber with the end cap being intact in the first state and
  break the vacuum with the end cap being perforated by the driving peg when changing to the second state upon being actuated; and
  the driving peg is arranged to come into contact with the input conductor for short-circuiting to the enclosure or to ground upon being actuated.

When the vacuum is broken, the good insulation of the vacuum chamber is lost. The driving peg comes in substantially direct contact with the input conductor in operation, thus short-circuiting the cable connector to ground. The driving peg is designed so as to withstand the short circuit current and the associated heat generated in the driving peg when carrying the short circuit current. Thus, a non-interrupted, metallic grounding path is created in a robust manner.

The driving peg may be a thick metallic element with a sharp tip at its end.

The thickness of the driving peg results in a sufficiently low resistance of the driving peg to withstand the short circuit current without being burnt by the generated heat when carrying the short circuit current. The sharp tip allows an easy penetration of the end cap of the vacuum chamber, so that the end cap is easily broken, and the driving peg is substantially uninterruptedly driven into contact with the input conductor.

In an embodiment, the driving peg welds to the input conductor upon contact.

In an alternative further embodiment, the vacuum chamber is provided with a contact pair of a first contact and a second contact connected with at least a vacuum bellow, the first contact being electrically connected to enclosure or to ground, the second contact being electrically connected to the input conductor, the first contact and the second contact being separated in the first state, the first contact and the second contact being in electrical contact in the second state; and the driving peg is arranged to, upon being actuated, bring the first contact into contact with the second contact for short-circuiting the input conductor to the enclosure or to ground.

Hence, in this embodiment, the vacuum chamber remains in tact.

In an embodiment, the first and the second contact weld to each other upon contact, thus creating a permanent short-circuit.

The short-circuit device may further comprise a metallic plug with a guiding channel, the driving peg being arranged to, when actuated by the actuator, move through the guiding channel. The metallic plug may be grounded. The metallic plug is designed such as to withstand the short short-circuit current pulse. The guiding channel may be a cylindrical hole extending through the metallic plug. The driving peg may be grounded via the metallic plug. The driving peg and the guiding channel thus form a sliding contact between the driving peg and ground.

The insulating plug may comprise a conductive layer at the first surface. In embodiments where the insulating plug comprises a vacuum chamber, the vacuum chamber may comprise the conductive layer at the end cap of the vacuum chamber.

This shields the driving peg dielectrically from the input conductor during normal operation of the switching installation.

In a further embodiment, the enclosure is grounded, so as to have a well-defined voltage reference and to minimize interference to and from the outside world.

The gas in the enclosure may comprise a gas component selected from the group of air and $SF_6$.

Both air and $SF_6$ can serve as an insulation between the enclosure, the input conductor and possible other conductive elements in the enclosure.

As discussed above, air may be used because of, e.g., environmental reasons. $SF_6$ may be used for maximum compactness of the enclosure.

The switching installation may further comprise a circuit breaker, which is connected to the input conductor, an optional disconnector for making or breaking a conductive connection between the input conductor and a rail system, the disconnector and the rail system running through the enclosure.

The switching installation may be of three-phase design, with three of each of the abovementioned components per functional unit (also referred to as a field), these components being physically and electrically separated from one another for each phase.

The switching installation may further comprise a grounding device with an operating handle, the operating handle being situated at the outside of the enclosure, wherein the grounding device is arranged to be operated by an operator from the operating handle, and to ground at least one of the input conductor and the other conducting elements upon being operated. This allows the operator to manually put the switching installation in a safe mode, e.g., when it needs to be accessed for maintenance.

In a further aspect, the present invention related to a method for use with a switching installation (5) comprising a gas-filled enclosure (30) comprising an input conductor (33), the input conductor (33) and the enclosure (30) being insulated from each other by at least a gas and a solid cable insulation (42), comprising creating a short-circuit through the solid cable insulation (42) between the input conductor (33) and the enclosure (30) upon the occurrence of a first arc (62) in the enclosure (30).

In a further embodiment, creating the short-circuit is performed in reaction to an increase in pressure in the enclosure (30).

In an embodiment the method, creating the short-circuit comprises cancelling an insulation provided by a vacuum in a vacuum chamber between the input conductor (33) and the enclosure (30).

SHORT DESCRIPTION OF FIGURES

These and other aspects of the invention will be further elucidated and described in detail with reference to the drawings, in which corresponding reference symbols indicate corresponding parts:

FIG. 7b shows a detail of FIG. 7a;

FIG. 8a shows a simplified cross-sectional view through the enclosure in the switching installation according to the fourth embodiment of the present invention upon energetic arcing;

FIG. 8b shows a detail of FIG. 8a;

DETAILED DESCRIPTION

Figure 1:
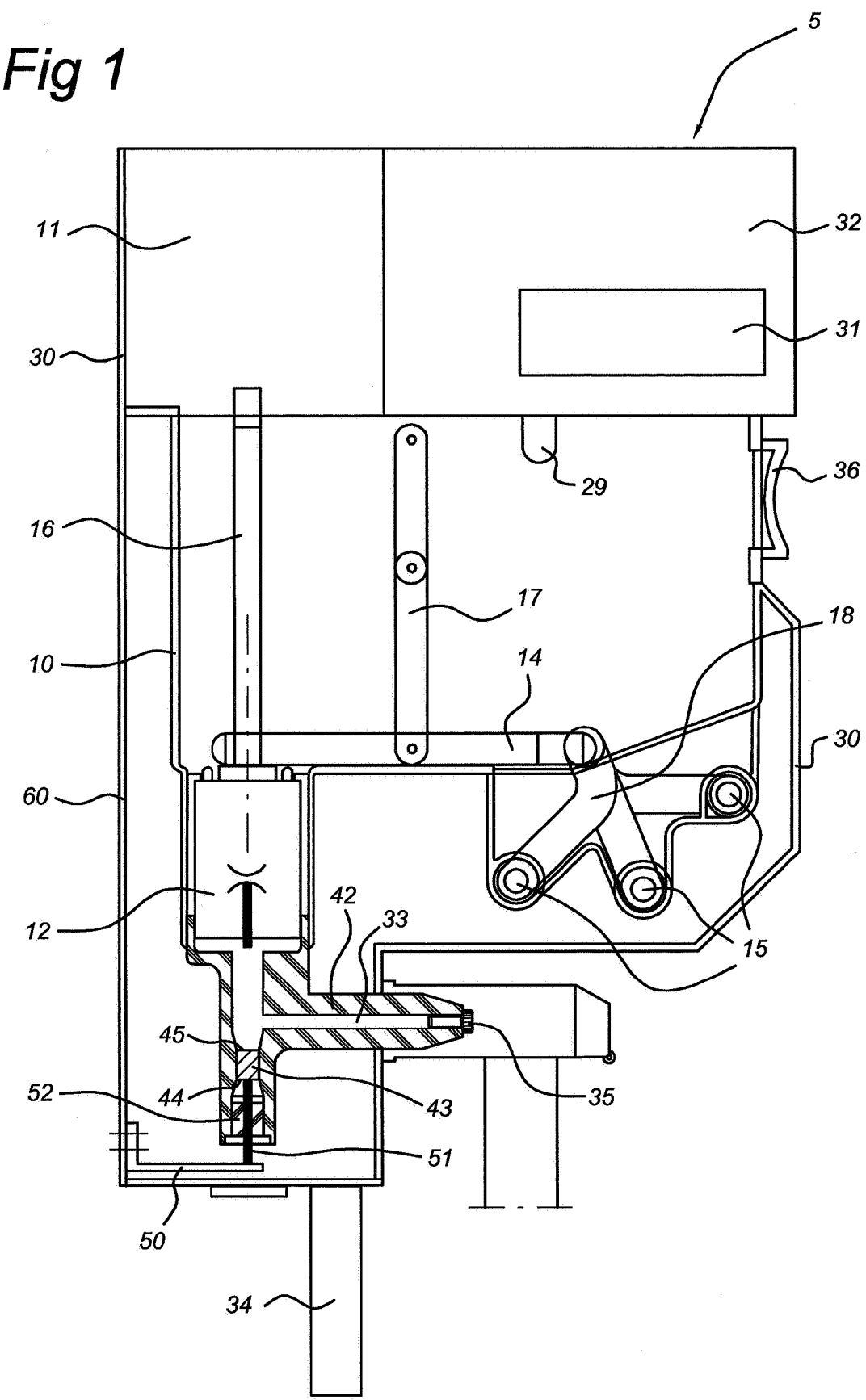
FIG. 1 shows a simplified cross-sectional view through an enclosure in a switching installation according to a first embodiment of the present invention.

FIG. 1 shows a simplified cross-sectional view through an example of an electrical switching installation 5 for medium or high voltage according to one embodiment of the present invention. The switching installation 5 comprises a closed enclosure 30 made from metal, inside which the elements of the switching installation 5 are located. The enclosure 30 is mounted on a securing frame 34. In the example shown, the switching installation 5 is used to make or break an electrical connection between a power supply line 35, which is connected to a cable connection 33, and one of the rails 15 of a three-phase rail system. A conductor leads from the cable connection 33 to a bottom connection of a circuit breaker 12, in the form of a vacuum circuit breaker, which is actuated by a drive rod 16. In the switching installation 5, the circuit breaker 12 is used to switch currents on and off. The other connection of the circuit breaker 12 is connected, in the example shown, via a sliding electrically conductive connection, to a first side of a disconnector 14 which is actuated by a second drive rod 17. The sliding electrically conductive connection means that there is electrical contact between circuit breaker 12 and disconnector 14 irrespective of the position of the circuit breaker 12 and the disconnector 14. In the closed position, the other side of the disconnector 14 is in contact with a branch rail 18, which is connected to one of the rails 15 which extends perpendicular to the plane of the drawing. The disconnector 14 can also electrically disconnect the conduction path between cable connection 33 and rails 15 by means of the second drive rod 17. The disconnector 14 can also be brought into contact with a ground contact 29, so that the entire electric circuit from circuit breaker 12 can be grounded. The drive rod 16 and second drive rod 17 for the circuit breaker 12 and disconnector 14, respectively, are operated by a drive mechanism 11 which is located on the top side of the closed enclosure 30 indicated by a thick line in FIG. 1. In addition to this mechanism 11, on the top side of the enclosure 30 there is also a space for secondary equipment 31 (such as safety, measuring and recording equipment) and a control panel 32.

FIG. 1 shows a cross-sectional view which only shows one phase section of a switching installation 5. It will be clear to the person skilled in the art that the other two phase sections of the switching installation 5 are located in the direction perpendicular to the plane of the drawing, the corresponding branch rail 18 then in each case being connected to a different rail 15 of the rail system. The three phase sections together form a functional unit, also referred to as a field. Therefore, for a complete switching installation 5, a plurality of functional units can be positioned next to one another.

The top side of the circuit breaker 12, its drive rod 16, the disconnector 14 and its second drive rod 17 and the branch rail 18, ground contact 29 and sections of the rail 15 may be surrounded, as in the exemplary embodiment illustrated, by an electrically insulating barrier 10 which is used for dielectric separation (or insulation) with respect to the adjacent phases and with respect to the closed enclosure 30.

The cable connection or input conductor 33 is equipped with a solid cable insulation 42 which is used for insulation with respect to other conducting elements and the closed enclosure 30. The solid cable insulation 42 comprises an insulating plug 43 fitting a hole in the solid cable insulation 42 close to the input conductor 33. In this exemplary embodiment, the insulating plug 43 is for example manufactured from rubber or any other suitable material which has electrically insulating properties but which is pierceable at the same time. In alternative embodiments, similar to the embodiments described below with reference to FIG. 10-FIG. 11, the insulating plug comprises a vacuum chamber for providing electrical insulation, with a piercable end cap. The upper surface 45 of the insulating plug 43 may be in contact with the input conductor 33, or at a close distance from it. A thin, metal driving peg 51 is located at the lower surface 44 side of the insulating plug 43. The lower surface 44 may be covered with a conductive layer 46 for shielding the driving peg 51 from the input conductor 33 during normal operation of the switching installation. The driving peg 51 is guided by a metal plug 52, also fitted in the hole in the solid cable insulation 42. In the shown example, the metal plug 52 is grounded. Alternatively, the metal plug 52 is not grounded itself but provides, when the driving peg 51 is actuated as described below, an electrical contact to the enclosure 30. The driving peg 51 is capable of conducting a large current. In alternative embodiment the driving peg itself may be grounded. The insulating plug 43, the driving peg 51, and possibly the metal plug 52 together form a short-circuit device, the functioning of which will be described below.

The enclosure 30 comprises an actuator having a mechanical link 50 with the enclosure 30. The mechanical link 50 connects a section 60 of the enclosure 30 to the driving peg 51.

Figure 2:
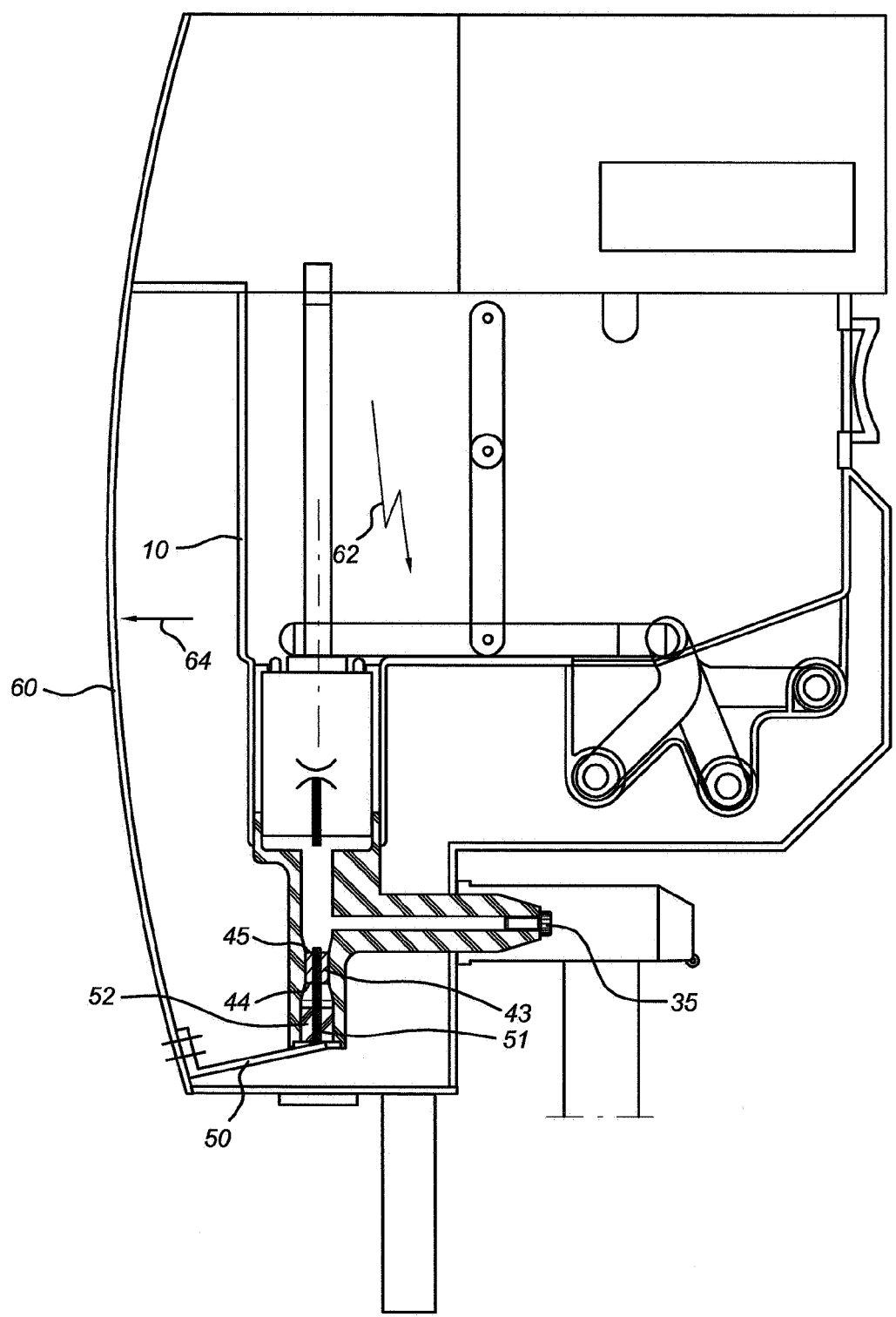
FIG. 2 shows a simplified cross-sectional view through the enclosure in the switching installation according to the first embodiment of the present invention upon energetic arcing.
Figure 3:
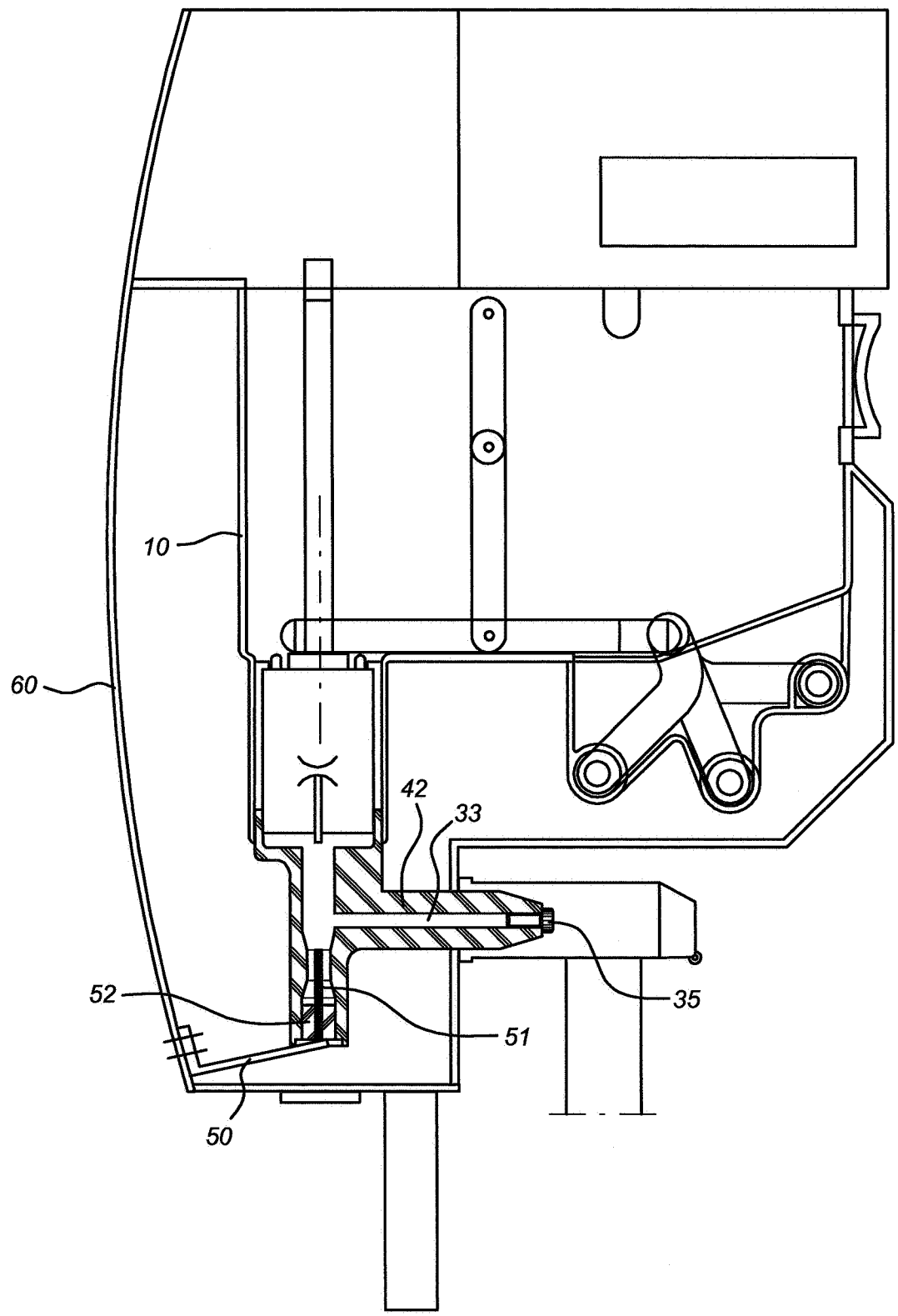
FIG. 3 shows a simplified cross-sectional view upon activation of the arc protection.

FIG. 2 shows the electrical switching installation 5 upon the occurrence of a first, energetic arc 62 between the disconnector 14 and the enclosure 30. This first arc 62 is so energetic that it generates a lot of heat, heating the air in the enclosure 30 and resulting in an expansion 64 of the section 60 of the enclosure 30. Due to the alternating current behaviour of the supply current, this energetic arc 62 may be maintained for a considerable time if no further measures would be applied, as it will ignite at each subsequent cycle of the alternating current. In this embodiment however, the expansion 64 of the enclosure acts on the mechanical link 50, which drives the driving peg 51 upward. The driving peg 51 perforates the insulating plug 43 all the way through the upper surface 45 thereof. In this way, a metallic and hence electrically conductive path is created from the input conductor 33 to ground as a short-circuit. A large short-circuit current will run through the driving peg 51. The first energetic arc 62 is now extinguished, as is shown in FIG. 3, and the associated risks are removed. The short-circuit usually continues until the voltage is taken of the input conductor 33 with an external switch on the power supply line 35.

Figure 4:
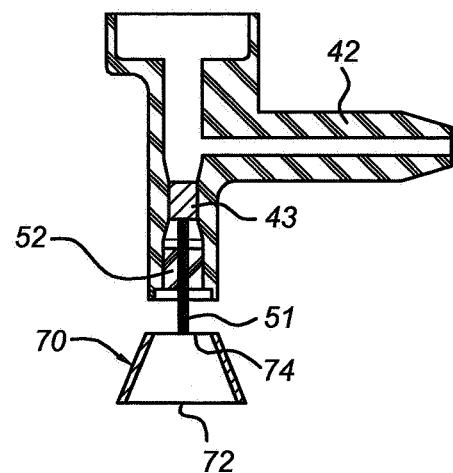
FIG. 4 shows a simplified cross-sectional view through an enclosure in a switching installation according to a second embodiment of the present invention.

An alternative embodiment is shown in FIG. 4. Instead of the mechanical link, the actuator 50 in the enclosure 30 comprises a pressure box 70. The pressure box 70 has a flexible input surface 72 and a flexible output surface 74. The flexible output surface 74 is connected to a driving peg 51. The driving peg 51 is arranged to, upon being driven, perforate an insulating plug 43, like in the embodiment described above.

Figure 5:
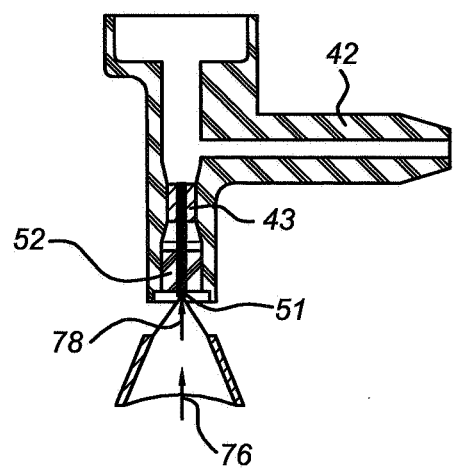
FIG. 5 shows a simplified cross-sectional view through the enclosure in the switching installation according to the second embodiment of the present invention upon energetic arcing.

FIG. 5 shows the behaviour of the pressure box 70 upon the occurrence of a first, energetic arc 62. The expansion of the air in the enclosure 30 will act upon the flexible input surface 72, causing an inward movement 76 of the flexible input surface 72. The air, diluted air or gas inside the pressure box 70 will transfer this inward movement 76 of the flexible input surface 72 to an outward movement 78 of the flexible output surface 74, thus actuating the driving peg 51 in the upward direction to perforate the insulating plug 43.

Figure 6:
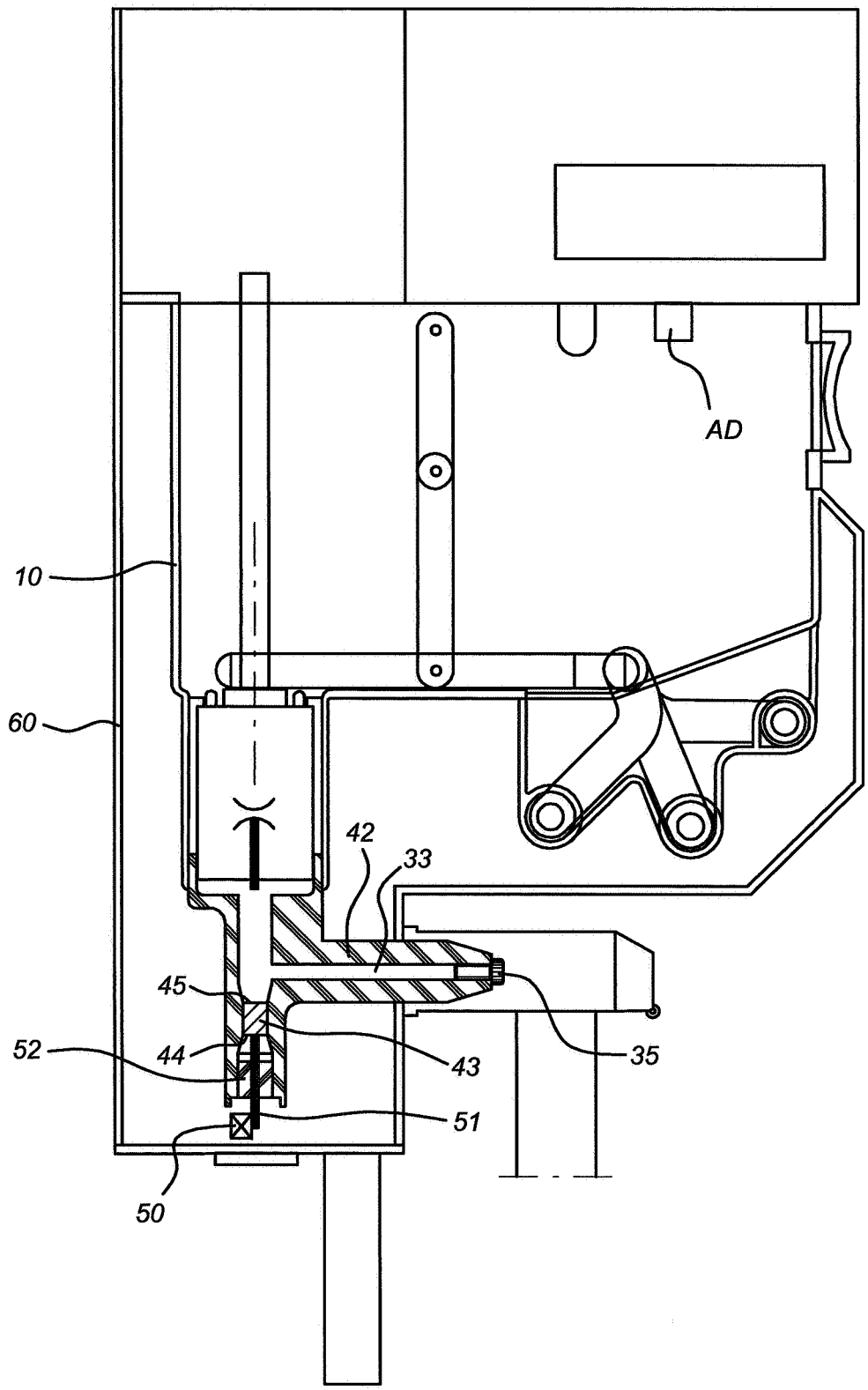
FIG. 6 shows a simplified cross-sectional view through an enclosure in a switching installation according to a third embodiment of the present invention.

Another alternative embodiment is shown in FIG. 6. The enclosure 30 comprises an arc detector AD and an active actuator 50. The arc detector AD detects a level of light originating from a first arc 62 in the enclosure 30. The arc detector AD may detect an absolute light level or a variation (increase) in light level. Alternatively, the arc detector AD could detect a level of ionization originating from the first arc 62. The arc detector AD may detect an absolute ionization level or a variation (increase) in ionization level. If the arc detector AD detects an energetic arc, the active actuator 50 will operate to drive the driving peg 51. The driving peg 51 is arranged to, upon being driven, perforate an insulating plug 43, like in the embodiments described above. The active actuator 50 can be of many different nature. The active actuator 50 may be a motor, such as a linear motor, driving the driving peg 51. Alternatively, the active actuator 50 may release a pre-tensioned spring (not drawn) acting on the driving peg 51 upon being released.

Figure 7A:
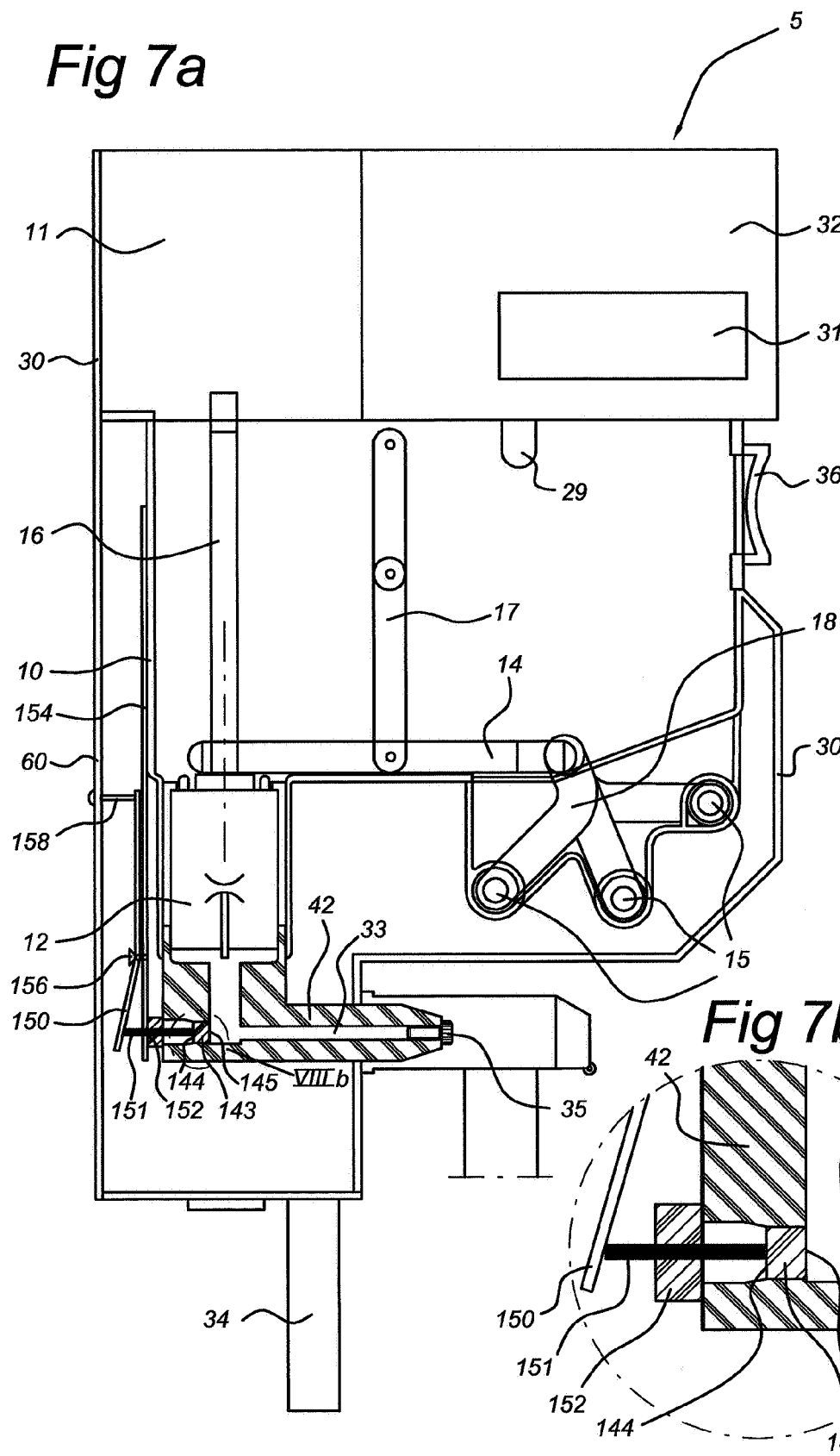
FIG. 7a shows a simplified cross-sectional view through an enclosure in a switching installation according to a fourth embodiment of the present invention.
Figure 7B:
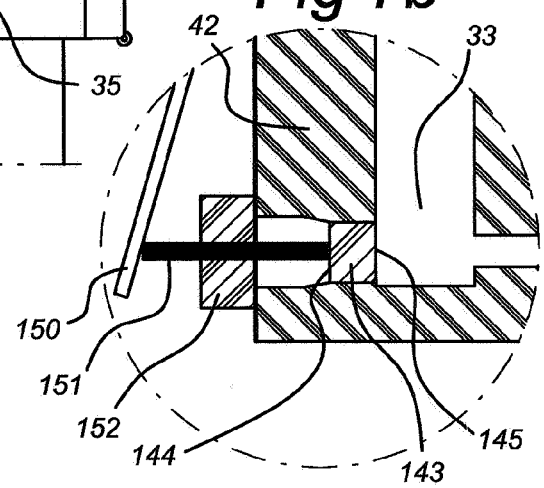

Another embodiment is shown in FIG. 7a, FIG. 7b, FIG. 8a and FIG. 8b. FIG. 7a shows a simplified cross-sectional view through an enclosure in a switching installation according to a fourth embodiment of the present invention. FIG. 8a shows a cross-sectional view upon energetic arcing. FIG. 7b shows a detail of FIG. 7a. FIG. 8b shows a detail of FIG. 8a.

The embodiment differs from the embodiments shown in FIG. 1-FIG. 6, in that the short-circuit device 143, 151, 152 is arranged with the driving peg 151 in a horizontal arrangement. A mechanically-fixed reference plate 154 is mounted in between the insulating barrier 10 and the enclosure 30. The actuator comprises a hinged mechanical link 150, a hinge 156 and a connector 158. The hinged mechanical link 150 is connected to the reference plate 154 with the hinge 156 and connected to the enclosure with the connector 158. Upon energetic arcing, a pressure increase will cause an expansion 64 of the section 60 of the enclosure. The expansion 64 of the section 60 of the enclosure acts via the connector 158 on the hinged transfer link 150. The upper part 252 of the hinged mechanical link 150 in between the connector 158 and the hinge 156 will thus move to the left. This movement is transferred via the hinge 156 to a movement to the right of the lower part of the hinged mechanical link 150. This drives a driving peg 151 to the right. The driving peg 151 is guided by a metal plug 152. In this exemplary embodiment, the metal plug 152 is grounded. The driving peg 151 penetrates the insulating plug 143 in the solid cable insulation 42 around the input conductor 33 from the left surface 144 to the right surface 145, thus creating a short-circuit from the input conductor 33 to the grounded metal plug 152.

Figure 9:
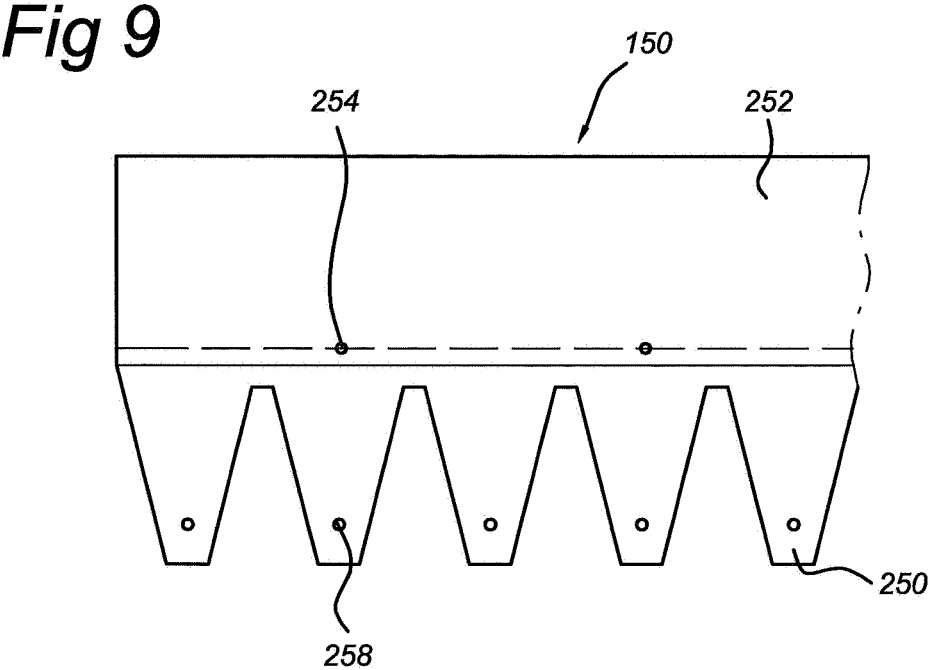
FIG. 9 shows a mechanical link for use in the fourth embodiment.

FIG. 9 shows a mechanical link for use in this fourth embodiment, when the embodiment is used in a three-field switching installation of a three-phase design. In this embodiment, the components (input conductor 33, circuit breaker 12, disconnector 14, drive rods 16, 17) inside the insulating barrier 10 and the solid cable insulation 142 of different phases are physically and electrically separated from one another within the enclosure 30. Each solid cable insulation comprises a respective insulating plug 143, associated with a corresponding arc initiator. The enclosure 30 is common to all phases and all fields.

The hinged mechanical link 150 is a single, common element for all three fields and all three phases. The hinged mechanical link 150 connects via connectors 158 to the enclosure 30 for each phase and field, i.e. in this example with nine connectors 158 in total connected to the upper part 252 of the hinged mechanical link 150. The hinged mechanical link 150 further comprises a plurality of fingers 250 on the lower part. The plurality of fingers comprises one finger 250 for each arc initiator, each finger 250 being arranged for driving a corresponding driving peg 151 from a corresponding position 258 on the corresponding finger 250.

The part 60 of the enclosure that may expand upon the occurrence of an energetic arc will thus affect the hinged mechanical link 150 to transfer the expansion of the part 60 of the enclosure to each of the driving pegs 151 of the arc initiators via the hinges 156 at positions along a hinge axis 256 and the fingers 250. The fingers 250 have a sufficiently large stiffness to transfer the movement of the hinged mechanical link 150 to the driving pegs 151 and to perforate the insulating plugs 143. Moreover, each of the fingers 250 is sufficiently resilient to allow the movement of the hinged mechanical link 150 to complete until also all other fingers have perforated the corresponding insulating plugs, hence until all fields and phases are provided with a respective current path to ground.

In further embodiments, the insulating plug 43 or 143 is a substantially solid plug made from an insulating material, e.g. rubber.

Figure 10:
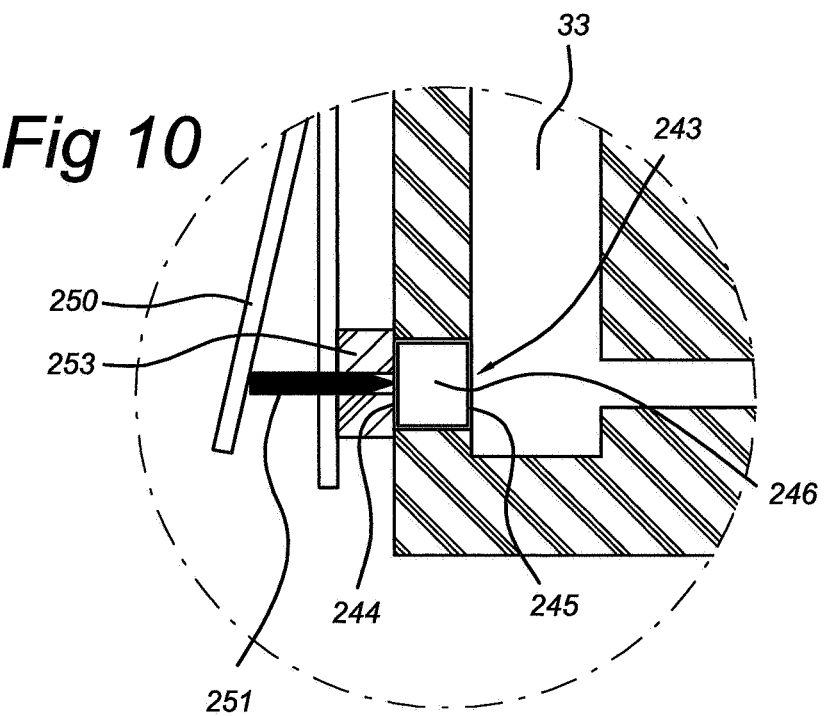
FIG. 10 shows a detail of a simplified cross-sectional view through an enclosure in a switching installation according to a fifth embodiment of the present invention.
Figure 11:
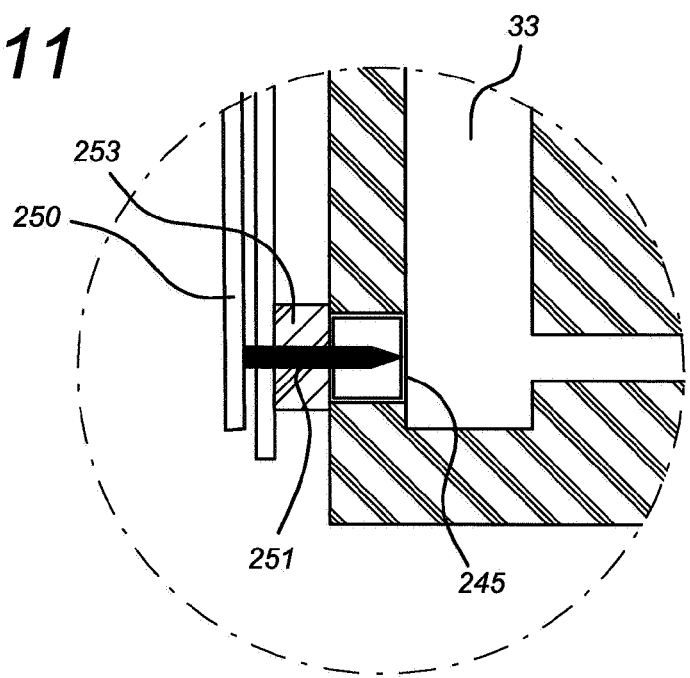
FIG. 11 shows a detail of a simplified cross-sectional view through an enclosure in a switching installation according to a fifth embodiment of the present invention upon energetic arcing.

A fifth embodiment using an alternative embodiment of an insulating plug is shown in FIG. 10 and FIG. 11. In this alternative embodiment, the insulating plug 243 comprises a vacuum chamber 246 with a first end cap 244 and a second end cap 245. A driving peg 251 is arranged close to the first end cap 244 and is arranged to be guided by a metal plug 252 for perforating the first end cap 244 when an actuator 250 is activated upon the occurrence of an energetic arc 62 in the enclosure. The vacuum chamber 246 normally contains a vacuum, providing a strong insulation between the input conductor 33 and other conductive parts such as the driving peg 251. When the actuator 250 is activated however, the driving peg 251 is driven to perforate the first end cap 244, thus breaking the vacuum, to perforate the second end cap 245 contact the input conductor 33. The driving peg 251 then carries away the current from the input conductor 33 to ground and the energetic arc 62 is extinguished and further risk of harm to the installation and/or to operating personnel near the installation is removed.

Figure 12:
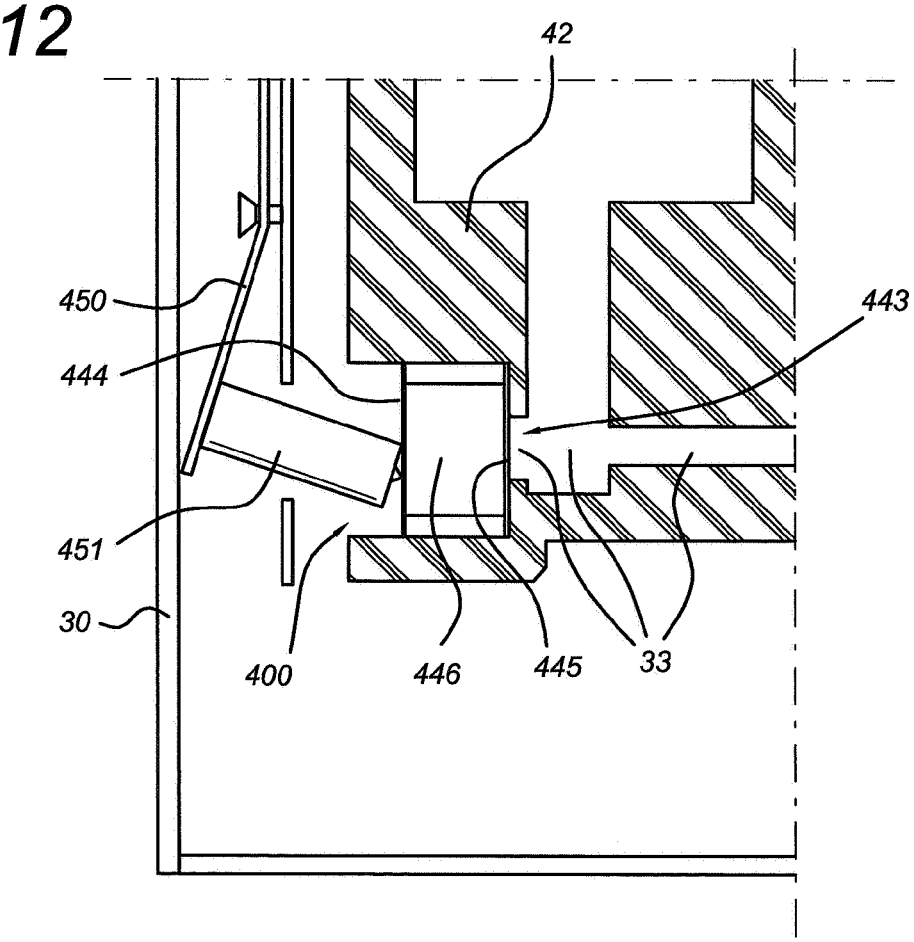
FIG. 12 shows a detail of a simplified cross-sectional view through an enclosure in a switching installation according to a sixth embodiment of the present invention.
Figure 13:
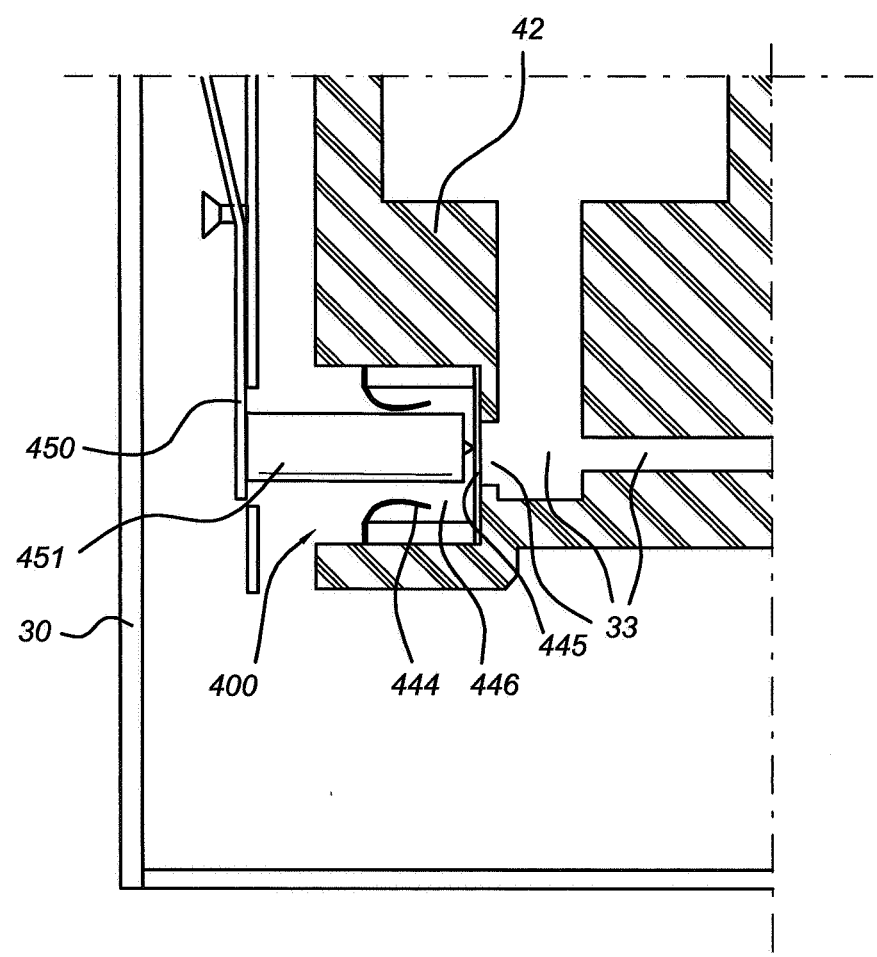
FIG. 13 shows a detail of a simplified cross-sectional view through an enclosure in a switching installation according to a sixth embodiment of the present invention upon energetic arcing.

FIG. 12 shows a detail of a simplified cross-sectional view through an enclosure in a switching installation according to a sixth embodiment of the present invention. FIG. 13 shows the same detail upon energetic arcing.

In this sixth embodiment, a short-circuit device 400 comprises an insulating plug 443 with a vacuum chamber 446 with a first end cap 444 and a second end cap 445. A driving peg 451 is arranged close to the first end cap 444 and is arranged to perforate the first end cap 244 when an actuator 450 is activated upon the occurrence of an energetic arc 62 in the enclosure, as is shown in FIG. 12 and FIG. 13.

The embodiment differs from the embodiments shown in FIG. 10 and FIG. 11, in that the driving peg 451 is a relatively thick and robust metallic peg, directly connected to the actuator. Using a thicker peg allows a wide choice of materials than the thin pegs used as driving pegs 51, 151, 251 in the embodiments described above, for being able to withstand the large short-circuit current. Moreover, when using a thicker peg, an additional device used for guiding the peg like the metal plugs 52, 152, 252 of the embodiments described above is not necessary for a robust operation.

Figure 14:
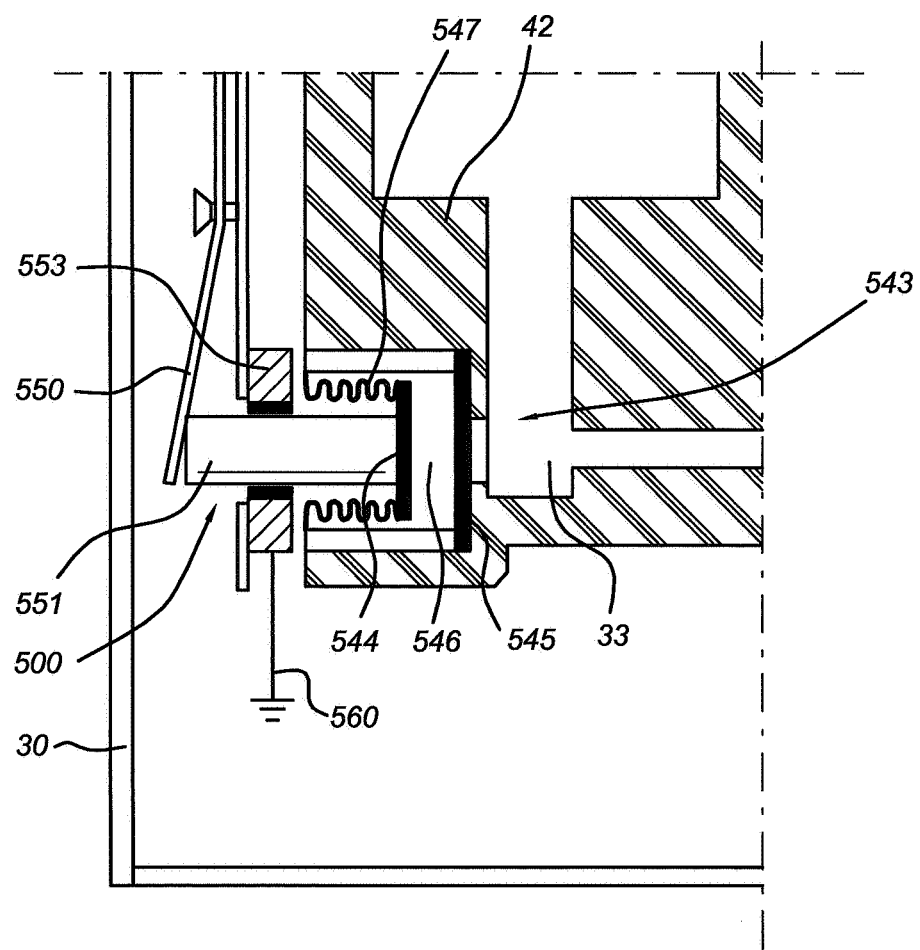
FIG. 14 shows a detail of a simplified cross-sectional view through an enclosure in a switching installation according to a sixth embodiment of the present invention.
Figure 15:
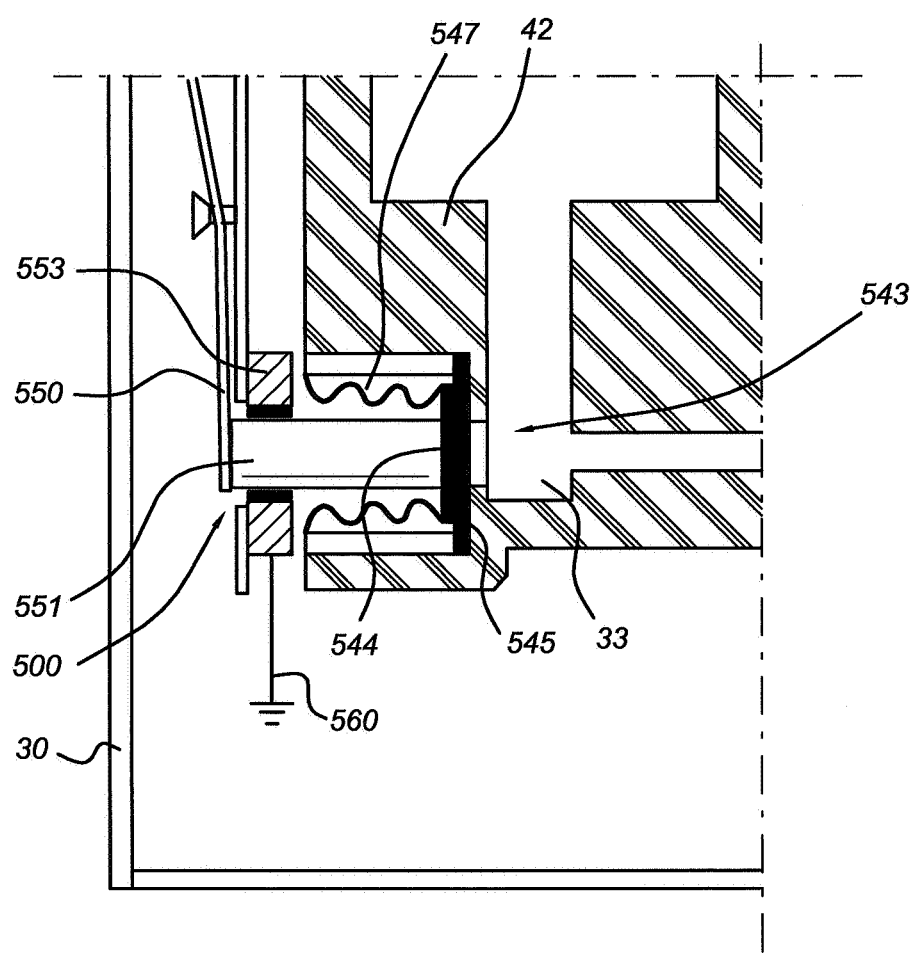
FIG. 15 shows a detail of a simplified cross-sectional view through an enclosure in a switching installation according to a sixth embodiment of the present invention upon energetic arcing.

FIG. 14 shows a detail of a simplified cross-sectional view through an enclosure in a switching installation according to a seventh embodiment of the present invention. FIG. 15 shows the same detail upon energetic arcing.

In this sixth embodiment, a short-circuit device 500 comprises an insulating plug 543 with a vacuum chamber 546 provided with a contact pair of a first contact 544 and a second contact 545. A vacuum bellow 547 is provided between the first contact 544 and the second contact 545, allowing the first and second contact to move towards and away from each other while maintaining the vacuum in the vacuum chamber 546. A driving peg 551 is connected to the first contact 544. The driving peg 551 is provided with a metal guidance element 553. An actuator 350, connected to the enclosure 30 as in the fourth, fifth and sixth embodiment, is arranged to drive the driving peg 551 with the first contact 544 towards and in contact with the second contact 545 upon energetic arcing in the enclosure 30. The first contact 544 may electrically connected to enclosure 30 via the driving peg 551 and the actuator 350. The first contact 544 may alternatively or additionally be electrically connected to a separate grounding point 560, e.g. via a sliding contact formed by the driving peg 551 and the metal guidance element 553 as shown in FIG. 14 and FIG. 15. The second contact 545 is electrically connected to the input conductor 33. In an alternative embodiment, the second contact 545 is formed by a part of the input conductor 33.

The present invention has been illustrated on the basis of (simplified) embodiments illustrated in the figures. It will be clear to the person skilled in the art that numerous variations and modifications are possible within the inventive concept of the present invention, e.g., although the embodiments illustrated in the figures employ an air-filling in the enclosure, the enclosure may also be filled with $SF_6$. Elements described in relation with one embodiment may be used in relation with another embodiment, e.g. the different embodiments of actuators may be used with any of the different embodiments of short circuit devices.

The invention claimed is:

1. A switching installation comprising:
   a gas-filled enclosure;
   an input conductor arranged to carry an input voltage;
   solid insulation arranged between the input conductor and the enclosure to insulate them from each other;
   a ground point;
   an actuator; and
   a short-circuit device,
   wherein the short-circuit device is changeable from a first condition in which the solid insulation is insulating the input conductor from the enclosure to a second condition in which the short-circuit device forms a non-interrupted, metallic grounding path between the input conductor and the ground point through the solid insulation, and the actuator is arranged to actuate the short-circuit device from the first condition to the second condition upon the occurrence of a first arc in the enclosure,
   wherein the actuator is arranged to react on an increase in pressure in the enclosure upon the occurrence of the first arc, and
   wherein the actuator comprises a mechanical link with the enclosure and the actuator is arranged to transfer an expansion of a part of the enclosure to the short-circuit device using the mechanical link.

2. The switching installation according to claim 1, wherein the path in the second condition is established between the input conductor and the ground point via the enclosure.

3. The switching installation according to claim 1, wherein the path in the second condition is established between the input conductor and the ground point being separate from and located inside the enclosure.

4. The switching installation according to claim 1, wherein the actuator and the short-circuit device are situated inside the enclosure.

5. The switching installation according to claim 1, wherein the solid insulation comprises a solid cable insulation for insulating the input conductor and the short-circuit device is arranged to create, upon being actuated, the short-circuit through a section of the solid cable insulation.

6. The switching installation according to claim 5, wherein the solid cable insulation is provided with a hole, and the short-circuit device is at least partially situated in the hole.

7. The switching installation according to claim 6, wherein the short-circuit device comprises a driving peg and an insulating plug with a first surface and a second surface, the insulating plug being inserted in the hole of the solid cable insulation, and a driving peg being arranged to, when actuated by the actuator, perforate the insulating plug from the first surface to the second surface and contact the input conductor.

8. A switching installation comprising:
   a gas-filled enclosure;
   an input conductor arranged to carry an input voltage;
   solid insulation arranged between the input conductor and the enclosure to insulate them from each other;
   a ground point;
   an actuator; and
   a short-circuit device,
   wherein the short-circuit device is changeable from a first condition in which the solid insulation is insulating the input conductor from the enclosure to a second condition in which the short-circuit device forms a non-interrupted, metallic grounding path between the input conductor and the ground point through the solid insulation, and the actuator is arranged to actuate the short-circuit device from the first condition to the second condition upon the occurrence of a first arc in the enclosure,
   wherein the solid insulation comprises a solid cable insulation for insulating the input conductor and the short-circuit device is arranged to create, upon being actuated, the short-circuit through a section of the solid cable insulation,
   wherein the solid cable insulation is provided with a hole, and the short-circuit device is at least partially situated in the hole, and
   wherein the short-circuit device comprises a vacuum chamber, the vacuum chamber being inserted in the hole and arranged for:
   insulating the input conductor from the enclosure with a vacuum in the vacuum chamber in a first state associated with the first condition, and
   short-circuiting the input conductor to the enclosure in a second state associated with the second condition.

9. The switching installation according to claim 8, wherein the short-circuit device further comprises a driving peg being arranged to change the vacuum chamber from the first state to the second state when actuated by the actuator.

10. The switching installation according to claim 9, wherein:
   the vacuum chamber comprises an end cap arranged to:
      maintain a vacuum in the vacuum chamber with the end cap being intact in the first state and
      break the vacuum with the end cap being perforated by the driving peg when changing to the second state upon being actuated; and
   the driving peg is arranged to come into contact with the input conductor for short-circuiting to the enclosure or to ground upon being actuated.

11. The switching installation according to claim 9, wherein:
- the vacuum chamber is provided with a contact pair of a first contact and a second contact connected with at least a vacuum bellow,
- the first contact being electrically connected to the enclosure or to ground,
- the second contact being electrically connected to the input conductor,
- the first contact and the second contact being separated in the first state,
- the first contact and the second contact being in electrical contact in the second state; and
- the driving peg is arranged to, upon being actuated, bring the first contact into contact with the second contact for short-circuiting the input conductor to the enclosure or to ground.

12. A method for use with a switching installation comprising a gas-filled enclosure comprising an input conductor, the input conductor and the enclosure being insulated from each other by solid insulation, comprising:
- creating a short-circuit by creating a non-interrupted, metallic grounding path through the solid insulation between the input conductor and ground upon the occurrence of a first arc in the enclosure,
- reacting to an increase in pressure in the enclosure upon the occurrence of the first arc by an actuator comprising a mechanical link with the enclosure, and
- transferring an expansion of a part of the enclosure to a short-circuit device to create the short-circuit using the mechanical link.

13. A method for use with a switching installation comprising a gas-filled enclosure comprising an input conductor, the input conductor and the enclosure being insulated from each other by solid insulation, comprising:
- creating a short-circuit by creating a non-interrupted, metallic grounding path through the solid insulation between the input conductor and ground upon the occurrence of a first arc in the enclosure,
- wherein creating the short-circuit is performed in reaction to an increase in pressure in the enclosure, and
- wherein creating the short-circuit comprises cancelling an insulation provided by a vacuum in a vacuum chamber between the input, the conductor and the enclosure.

* * * * *